United States Patent
Schlecht et al.

(10) Patent No.: US 6,796,599 B2
(45) Date of Patent: Sep. 28, 2004

(54) REAR WINDOW SHADE WITH LIFTING CASSETTE

(75) Inventors: Werner P. Schlecht, Vaihingen (DE); Herbert Walter, Ebersbach (DE)

(73) Assignee: BOS GmbH & Co. KG, Ostfildern (DE)

(*) Notice: Subject to any disclaimer, the term of this patent is extended or adjusted under 35 U.S.C. 154(b) by 0 days.

(21) Appl. No.: 10/464,159

(22) Filed: Jun. 18, 2003

(65) Prior Publication Data

US 2004/0012225 A1 Jan. 22, 2004

(30) Foreign Application Priority Data

Jun. 24, 2002 (DE) .......................................... 102 28 028

(51) Int. Cl.[7] .................................................. B60J 7/00
(52) U.S. Cl. ..................... 296/143; 296/97.8; 296/97.4; 160/370.22
(58) Field of Search ................................ 296/143, 97.8, 296/97.7, 84.1, 97.4, 97.9; 160/370.21, 370.22, 121.1, DIG. 3, 310, 84.05, 84.04

(56) References Cited

U.S. PATENT DOCUMENTS

| | | | | |
|---|---|---|---|---|
| 4,487,244 A | * | 12/1984 | Olson .......................... 160/238 |
| 4,836,263 A | * | 6/1989 | Ament ................... 160/370.22 |
| 4,869,542 A | * | 9/1989 | Lin ............................ 296/97.8 |
| 4,898,224 A | * | 2/1990 | Woodworth ............ 160/370.22 |
| 5,033,527 A | * | 7/1991 | Ouvrard et al. ........ 160/370.22 |
| 5,067,546 A | * | 11/1991 | Jeuffray et al. ......... 160/370.22 |
| 5,133,585 A | * | 7/1992 | Hassan ...................... 296/97.8 |
| 5,201,563 A | * | 4/1993 | Liao ........................... 296/97.8 |
| 5,201,810 A | * | 4/1993 | Ojima et al. ........... 160/370.22 |
| 5,249,616 A | * | 10/1993 | Yen .............................. 160/98 |
| 5,404,926 A | * | 4/1995 | Ojima et al. ........... 160/370.21 |
| 5,551,744 A | * | 9/1996 | Liao ........................... 296/97.8 |
| 5,562,144 A | * | 10/1996 | Ming-Shun ............. 160/370.22 |
| 5,647,421 A | * | 7/1997 | Hoffmann et al. .......... 160/120 |
| 5,653,277 A | * | 8/1997 | Kerner et al. .......... 160/370.22 |
| 5,791,721 A | * | 8/1998 | Lin ............................ 296/97.8 |
| 6,039,107 A | * | 3/2000 | Pittard .................... 160/370.22 |
| 6,086,133 A | * | 7/2000 | Alonso ...................... 296/97.8 |
| 6,216,762 B1 | * | 4/2001 | Lin ......................... 160/370.22 |
| 6,427,751 B1 | * | 8/2002 | Schlecht et al. ........ 160/370.22 |
| 6,460,593 B1 | * | 10/2002 | Floyd ..................... 160/370.22 |
| 6,598,929 B2 | * | 7/2003 | Schlecht et al. ........... 296/97.4 |
| 6,695,381 B2 | * | 2/2004 | Schlecht et al. ........... 296/97.4 |
| 2002/0059989 A1 | | 5/2002 | Schlect et al. |

FOREIGN PATENT DOCUMENTS

| | | | |
|---|---|---|---|
| DE | 3345503 | * | 8/1985 |
| DE | 3419975 | * | 12/1985 |
| DE | 42 02 081 C1 | | 3/1993 |
| EP | 0 424 327 A2 | | 4/1991 |
| EP | 1 107 873 B1 | | 6/2001 |
| JP | 4 266522 | * | 9/1992 |

* cited by examiner

*Primary Examiner*—Kiran Patel
(74) *Attorney, Agent, or Firm*—Leydig, Voit & Mayer, Ltd

(57) ABSTRACT

For closing the outlet slit of a window shade in a rear window shelf of a motor vehicle, a winding shaft of the rear window shade is seated in a window shade support which is movable in relation to the underside of the rear window shelf. By reason of such arrangement, it is possible either to use the window shade support itself for closing the slit when the window shade web is in the retracted position, or the winding shaft can be moved to close to the slit.

26 Claims, 8 Drawing Sheets

US 6,796,599 B2

REAR WINDOW SHADE WITH LIFTING CASSETTE

FIELD OF THE INVENTION

The present invention relates generally to window shades, and more particularly to retractable window shades for the rear windows of automobiles.

BACKGROUND OF THE INVENTION

Rear window shades are becoming increasingly popular for sedans. For space-saving reasons they are usually mounted below the rear window shelf so that in the retracted state they distract as little as possible.

So that no items can become lost in the slit for the rear window shade when it is retracted, the pull rod is often designed in such a way that it covers the slit to the greatest possible extent. A comparatively wide pull rod is needed for this because the width of the slit is a result of the radial distance of the winding shaft from the top of the rear window shelf and the inclination of the rear window. However, pull rods of such a width are considered to be distracting when the rear window shade is extended.

A rear window shade having a winding shaft which is rotatably seated below the rear window shelf and to which one edge of the window shade web is fastened is described in DE 42 02 061 A1. The other edge of the window shade web is attached to a pull rod operated by means of levers, which are pivotable around axes located next to the winding shaft and extending parallel with the vehicle axis. In the retracted state, the pull rod is pulled back underneath the slit.

A movable flap, whose movement is controlled by the pull rod, is provided in the rear window shelf for closing the slit. The flap is pre-stressed in the open position by means of a spring and is maintained closed by the retracted pull rod. The mechanical seating arrangement for the flap is elaborate and, because of the space conditions, must be intricate.

OBJECTS AND SUMMARY OF THE INVENTION

It is an object of the present invention to provide a window shade for rear windows of motor vehicles which is adapted for simple installation and which is capable of covering the window shade slit in the rear window shelf.

Another object is to provide a window shade of the above kind that is sturdy in construction and reliable in operation.

In carrying out the invention, a window shade is provided that has a window shade frame that is movably seated in bearing arrangements adjacent the rear window. This arrangement allows for two options:

The window shade frame itself can be used as a closing element for the slit in the rear window shelf so that separate parts which would have to be seated on the support of the winding shaft can be omitted. Moreover, seating the window shade shaft in the window shade frame allows an adjustment of the position of the winding shaft in such a way that the winding shaft can be brought into a more advantageous position in the sense that it is arranged closer to the slit so that a narrower slit can be used.

If the pull rod of the rear window shade is guided in lateral guide rails, the plane defined by the window shade web performs a more or less large pivot movement when the rear window shade is extended. The axis of the pivot movement is the line along which the window shade web is released from the circumference of the window shade web on the winding shaft. The farther the circumference of the winding shaft is located from the slip, the greater the width of the slit needs to be, so that no undesired contact between the edges of the slit and the window shade web occurs during the pivot movement. To this extent, the movable seating of the winding shaft is capable of moving it into a position in which it adjoins the slit more closely.

The other option lies in closing the slit off by means of the pull rod. This development enables the slit, which is being closed by the pull rod, to be extremely narrow. The slit can be narrowed by means of the movable seating of the winding shaft without, as mentioned above, a contact between the window shade web and the slit edge occurring in the course of extending the former.

Favorable space conditions, along with a rugged embodiment of the window shade frame, are obtained if the window shade frame has a tube-shaped element within which the winding shaft is contained. The tube-shaped element is provided with a continuous slit over its length, through which at least the window shade web exits, but through which the pull rod can also be pulled out. The tube-shaped element can be flattened in the area of its lateral faces so that it closes off the slit in the rear window shelf as cleanly as possible.

If the slit is closed by the pull rod, it suffices for the window shade frame to be formed by two separate parts, which are connected with each other via the winding shaft, and wherein each one is seated in the vehicle body or underneath the rear window shelf. The window shade frame can be substantially cylindrical, wherein seating members at the end are provided in the front ends of the tube-shaped element. In this case the movement axis extends through the interior of the tube-shaped element.

The actuation of the far edge of the window shade web is performed with the aid of guide rails extending on either side of the movement path of the pull rod. So that the pull rod can be retracted underneath the rear window shelf, the guide rails are located near the winding shaft and extend past it. The guide rails can define a surface which either runs through the belt, or extends tangentially past the belt being formed on the winding shaft when the window shade web is rolled up.

In order for the window shade frame to perform the desired movements, an actuating device is associated with it. In the simplest case the actuating device can be constituted by a spring, which pre-tensions the device in the desired way, or the movement can be derived from the actuating device for the window shade web itself, or alternatively, the window shade frame may be provided with its own actuating device, which is independent of the actuating device for the window shade web.

The seating device for the window shade frame provides two design possibilities. It can be embodied in such a way that in the course of its movement the window shade frame moves around a rotatory axis. The other possibility is an embodiment with a translatory axis. In the one case, pivot bearings are employed, while sliding guides are used in the other case.

Other objects and advantages of the invention will become apparent upon reading the following detailed description and upon reference to the drawings, in which:

Figure 1:
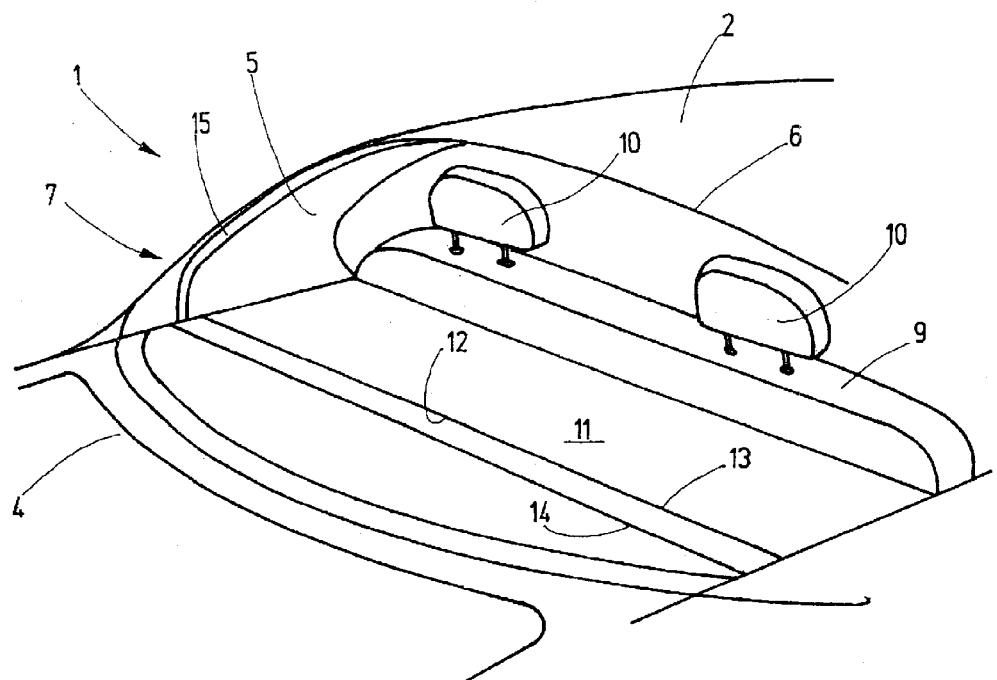
FIG. 1 is a schematic of a motor vehicle having a rear window shade in accordance with the invention, shown in a retracted position.

While the invention is susceptible of various modifications and alternative constructions, certain illustrated embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE PREFERRED EMBODIMENTS

Referring now more particularly to FIG. 1 of the drawings, there is shown the rear end 1 of a notch back sedan having a roof 2 and a trunk lid 4. A left C-pillar 5 with the interior trim fastened thereon can be seen between the trunk lid 4 and the roof 2. A rear window cutout 7, in which a rear window glass 8 is located, can be seen between the left C-pillar 5, a rear edge 6 of the roof 2, and the top of the trunk. A rear window shelf 11 extends between the lower edge of the rear window cutout 7 and the back of the rear seat 9 with headrests 10. A slit 12 extends transversely through the rear window shelf which is shown closed in a way yet to be described. The slit 12 is defined by two slit edges 13 and 14, which extend parallel with each other between two opposite C-pillars 5.

A guide rail 15 is shown in the inner trim of the left C-pillar 5, whose visible extension starts at the height of the slit 12 and follows the lateral contour of the rear window opening 7 as far as the vicinity of the roof 2. The mechanical portion of a rear window shade 16 is located underneath the slit 2, or in the slit 2.

Figure 3:
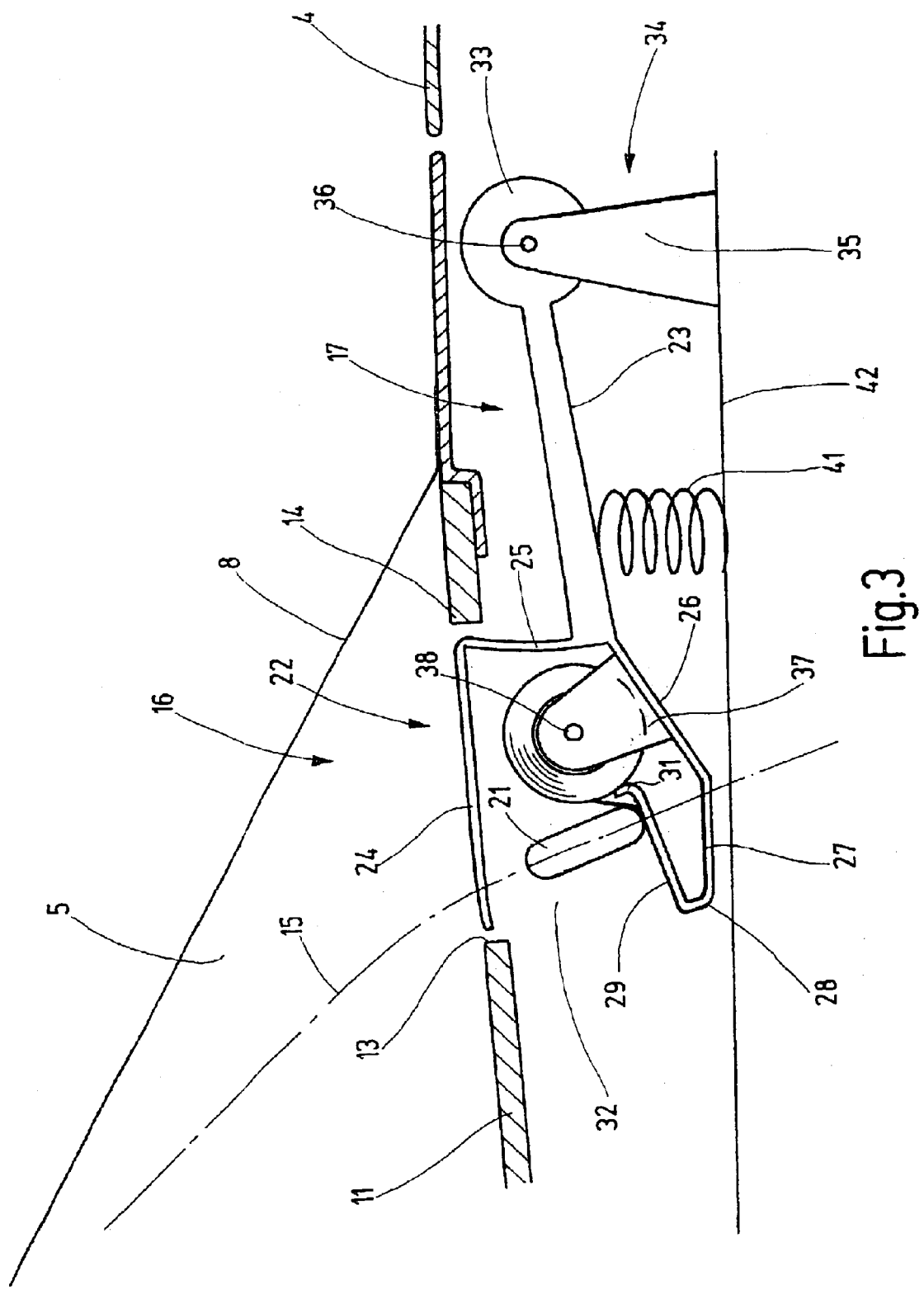
FIG. 3 is an enlarged schematic showing the window shade housing when the window shade in a closed position.
Figure 4:
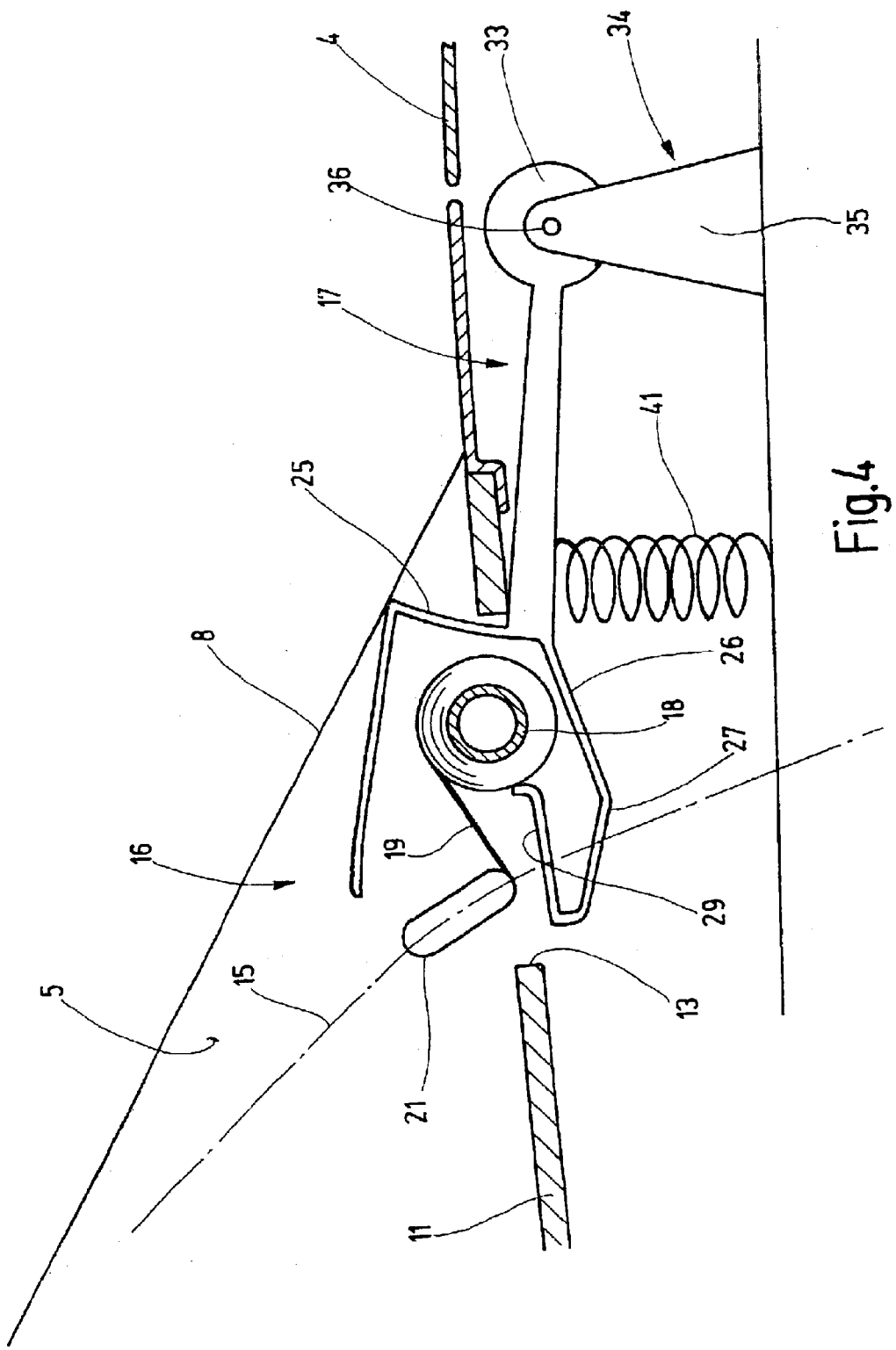
FIG. 4 is a schematic similar to FIG. 3, showing the rear window shade housing in an open position.

The structure of the rear window shade 16, as depicted in FIGS. 3 and 4, includes a window shade frame or support 17, in which a winding shaft 18 is rotatably seated. One edge of a window shade web 19 is fastened to the winding shaft 18 and its other edge is connected with a pull rod 21.

The window shade frame in this instance is a profiled extruded section which, viewed in cross section, is composed of a tube-shaped section 22 and a bracket or flange 23. The tube-shaped portion is constituted by an essentially straight leg 24 which, in a position of rest as depicted in FIG. 3, substantially fills the slit between the edges 13 and 14. A further leg 25 extends approximately at a right angle downwardly from the leg 24 and makes a transition into a leg 26 extending obliquely frontward. The leg 26 extends at an angle of approximately 60° and terminates at a further profiled leg 27 extending approximately parallel in respect to the leg 24. The leg 27 is bent over by approximately 170° at a front edge at 28 and forms a support leg 29, which ends at an upward extending, lip-shaped edge 31. A comparatively very wide outlet slit 32 is bordered in this way between the leg 24 and the leg 29 of the profiled element. The front edge of the leg 24 is located approximately above the bending point 28 where the leg 27 is bent over.

The plate-shaped bracket 23 starts at the connecting point between the leg 25 and the leg 26 and also extends over the entire length of the tube-shaped section 22. At its end remote from the tube-shaped section 22, the bracket 23 is provided with a bead 33. The window shade frame 17 is supported inside the vehicle body with the aid of the bead 33. A seating device 34 is provided for this purpose, which is composed of two vertically rising clips 35, which are located at a distance from each other and are fixed on the vehicle body. The bead-shaped section 33 extends between the clips 35, i.e. the distance between the clips 35 corresponding to the width of the window shade frame 17 when viewed in the direction transversely in respect to the longitudinal vehicle axis. A bolt 36 is placed into the upper end of the clip 35 and extends into a corresponding seating bore of the bead-shaped section 33. The window shade frame 17 can be pivoted along an axis parallel with the transverse axis of the vehicle.

The seating of the window shade frame 17 below the rear window shelf 11, or underneath the outer skin of the roof in the area of the rear end is such that the outlet slit 32 of the tube-shaped section 22 opens in the direction toward the front of the motor vehicle. In the illustrated embodiment, the seating is located near the front edge of the trunk lid 4, i.e. between the lower edge of the rear window cutout 7 and the trunk lid 4. Alternatively it is also possible to house the seating underneath the front portion of the rear window ledge 11. In that case the bracket 23 would then extend in the area of the front edge 13.

Two clips 37 containing bearing bores 38 for bearing pins of the winding shaft 18 are provided on the lower leg 26 for seating the winding shaft 18. As FIG. 4 shows, the winding shaft is tube-shaped and in a known manner contains in its interior a spring motor, by means of which the winding shaft 18 is pre-tensioned in the direction of winding up the window shade web 19. The bearing clip 37 has been omitted in FIG. 4 for purposes of showing the tube-shaped form of the winding shaft 18.

The window shade support 17 is pre-tensioned in the upward moved position with the aid of one or several helical pressure springs 41. For this purpose, one end of the helical pressure spring 41 is supported on a support 42 fixed on the vehicle body on which the clips 35 also have been fastened, and the other end is supported on the underside of the bracket 23.

As previously indicated, the two guide rails 15, represented in FIG. 1, are an additional part of the rear window shade 16. The course of the guide rails 15 is symbolized in FIGS. 3 and 4 by a dash-dotted line. The shape and the manner in which the pull rod 21 is guided can be seen in FIG. 5. The guide rails 15 run in both C-pillars 5 in such a way that they define a path of travel in a straight line.

Figure 5:
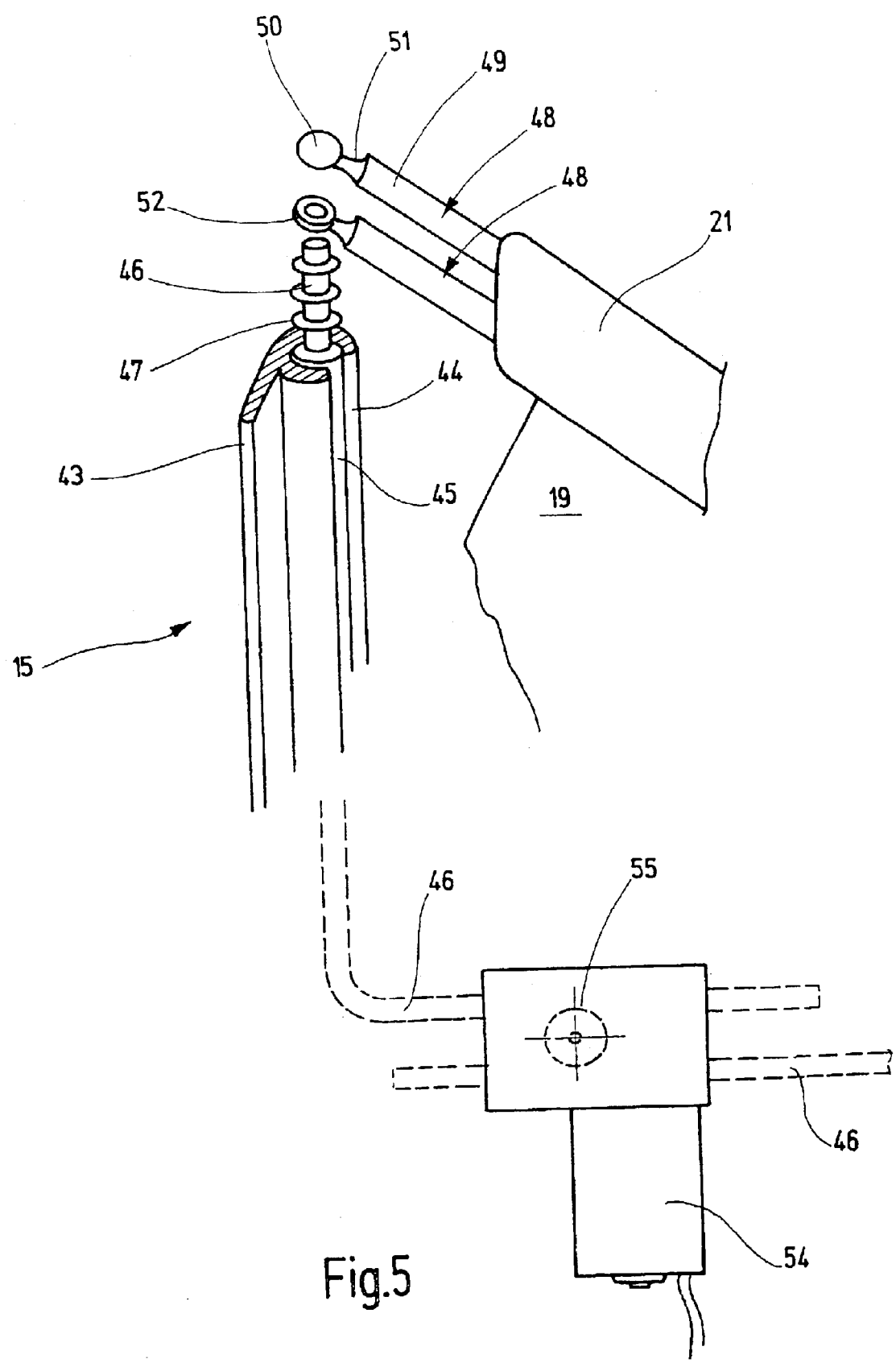
FIG. 5 is a schematic depicting the drive mechanism for the rear window shade shown in FIGS. 3 and 4.

FIG. 5 shows the profile of the guide rails 15. The guide rails 15 consist of a fastening flange 43, which has a tube-shaped profile 44 at one end that opens at a guide slit 45. The slit 45 extends over the entire length of the guide rail 15, opening in a direction perpendicularly in respect to the flange 43.

The guide rail 15 is simultaneously used as a buckle-proof guide device for a line-shaped push member 46, which is provided with a helically extending rib 47 on its exterior. As shown, the pull rod 21 has an approximately oval profile with the window shade web 19 fastened to a lower edge. The shape of the window shade web 19 corresponds approximately to the trapezoidal approximation of the shape of the window cutout 7.

Two vertically spaced guide members 48 are inserted into the front ends of the pull rod 21, which each have a cylindrical shaft 49 inserted in a longitudinally displaceable manner into the pull rod 21. A spherical head 50 is located on the upper shaft 49 and is connected with the shaft 49 via a neck portion 51. In place of the ball 50, the lower guide member 48 has a fastening ring 52, which is connected, fixed against pull and pressure, with the free end of the push member 46 by an appropriate fastening element. The exterior diameter of the ring 43 and the diameter of the spherical head 50 correspond to the clearance of the guide tube 44 so that both can slide in a guided manner in the guide tube 44, without being able to escape through the slit 45.

The push member 46 is driven by a gear motor 54, whose output gear wheel 55, indicated by dashed lines, is provided with teeth, which mesh with the push member 46. The helical rib 47 is used as the toothed arrangement so that the push member can also be considered a helical toothed rack.

The arrangement shown in FIG. 5, consisting of the guide rail 15 and the guide members 48, is similar on both sides of the pull rod 21, which is shown in a broken off representation. The two push members 46 are synchronously driven by a common gear motor 43. The arrangement so far described operates as follows:

With the rear window shade 16 retracted, the pull rod 21 rests on the leg 29 of the tube-shaped profile 22. In this area it is also guided between the two guide rails 15, which continues past the end area of the slit 12 discernible in FIG. 1 downward into the vehicle interior. As shown, they pass approximately tangentially in relation to a cylinder formed by the belt created from the window shade web 19. They furthermore run in front of the front ends of the tube-shaped profiled section 22.

The push members 46 are retracted and because of the connection of the lower guide member 48 with the associated push member 46, the pull rod 21 is forcefully pressed down at both ends so that it rests on the leg 29 and in the further course of the movement pushes the window shade frame 17 downward against the effect of the springs 41. In the lower position the leg 24 closes the slit 12 almost completely, as depicted in FIG. 1.

Figure 2:
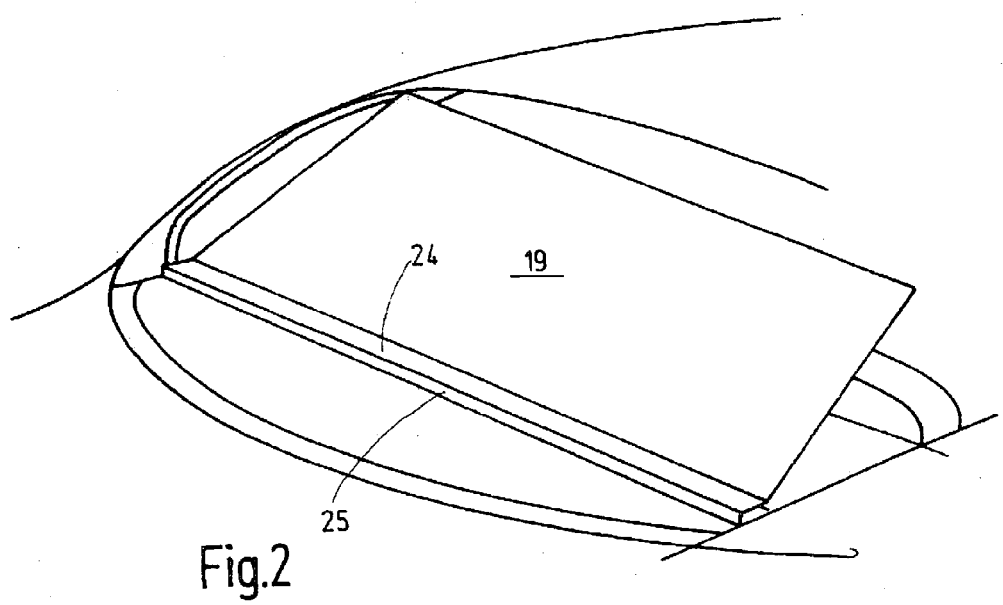
FIG. 2 is a schematic, similar to FIG. 1, showing the rear window shade extended.

If, starting from this position, the user wants to extend the rear window shade 16, he switches on the drive motor 54. The drive motor 54 drives the output gear wheel 55 in a direction in which the push members 46 are pushed forward in the guide rails 15 in the direction toward the roof 2. By means of this action, the pull rod 21 is lifted in the same direction at both ends. The window shade frame 17 is pivoted upwardly because of the action of the springs 41 until the bracket 23 contacts the rear window shelf 11 from below in the area of the slit edge 14. By means of this action, the position in accordance with FIG. 4 is achieved, in which the slit 32 extends practically over the entire top of the rear window shelf 11. In the continued course of the movement of the pull rod 21, the latter can now detach itself from the leg 29 and moves in the direction toward the roof 2, guided in the guide rails 15. FIG. 2 shows the extended position of the rear window shade.

For retracting the window shade, the motor 54 is put into motion in the opposite direction. The push members 46 are synchronously retracted so that the pull rod 21, which is positively connected at both its ends with respective push members 46, is moved back in the direction toward the rear window shelf 11. In the course of this movement the window shade web 19 is simultaneously wound onto the winding shaft 18 to a corresponding extent under power of the already mentioned spring motor.

As soon as the pull rod 21 approaches the lower leg 29 and touches it, the window shade frame 17 is pivoted downward against the force of the pressure springs 41. The tractive force required for this is transmitted by the drive motor 54 via the push members 46 to the lower guide member 48 at each end of the pull rod 21.

A comparison between FIGS. 3 and 4 shows a further advantage of the represented arrangement. Because of the special seating of the profiled section 22, the latter performs a vertical movement, as well as simultaneously a rotating movement around the axis of the bearing bolt 36. First, the winding shaft 18 is moved closer to the rear window glass 8 in the course of the change from the retracted position to the extended position. As can be seen in FIG. 4, it rises above the level of the rear window shelf 11 so that it lies as closely as possible next to the inside of the rear window glass 8. At the same time the outlet slit 32 is also rotated because of the orbital movement around the bearing bolt 36. Because of this combined movement it is possible to begin guiding the window shade web 19 already at the rear window shelf 11, very close to the inside of the rear window glass 8. It will be appreciated that if the winding shaft 18 were maintained in the low position during the draw-out, or the profiled section 22 were not turned, either the window shade would be a much greater distance from the rear window glass 8, or the window shade web 19 would scrape along the upper leg 24 when it is pulled through the slit 32. The amount of the rotating movement can be further increased by shortening the bracket 23, while the vertical lift remains the same.

Figure 6:
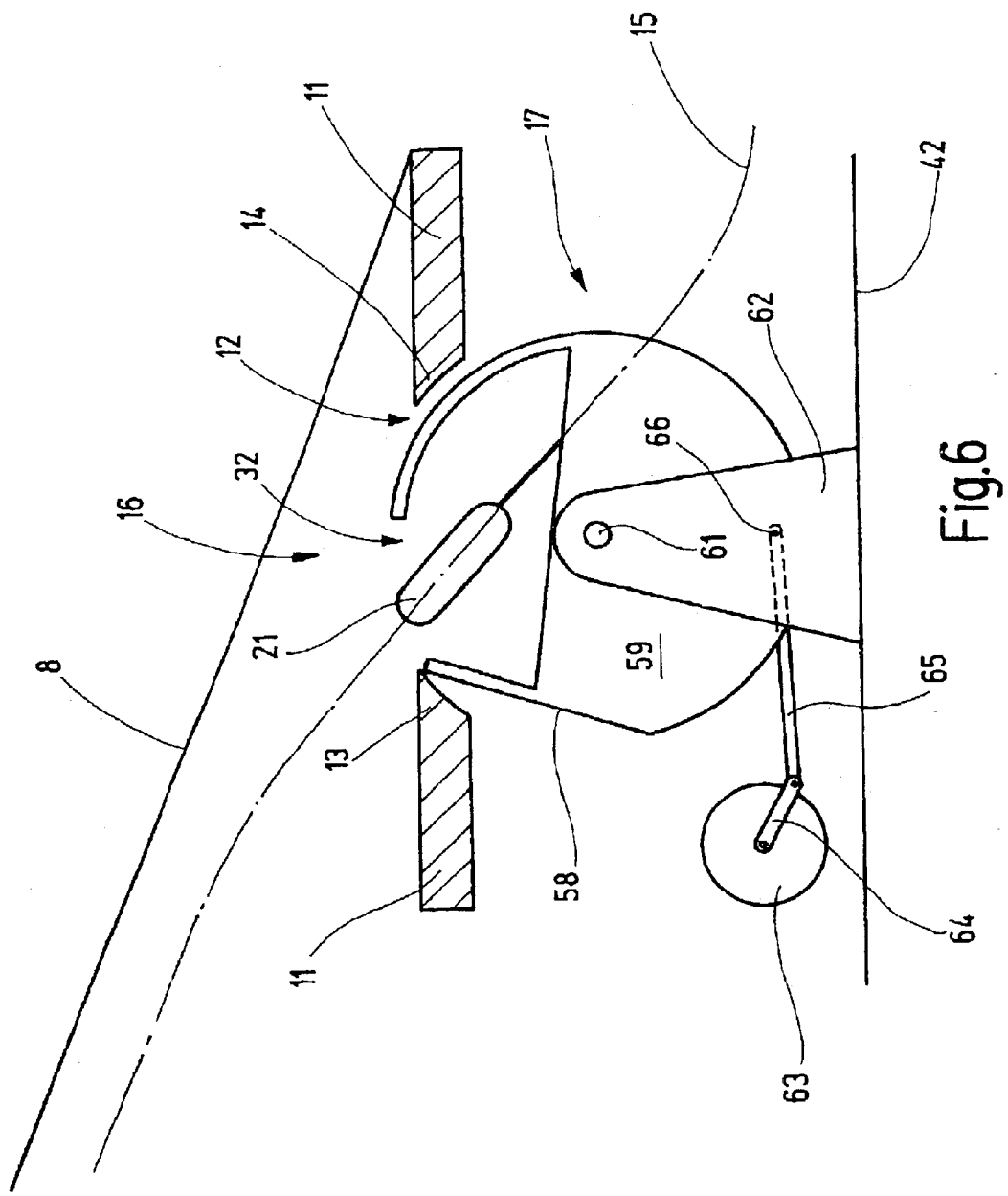
FIG. 6 is an alternative embodiment of rear window shade in accordance with the invention, shown in a partially extended condition.

A further exemplary embodiment of the rear window shade 16 is represented in FIG. 6. The same reference symbols will be used for parts which functionally correspond to parts from the previous exemplary embodiment. The window shade support 17 in this case is embodied as a substantially cylindrical tube, which is flattened at 58. The outlet slit 32 is located next to the flattened part 58 and extends over the entire length.

Figure 7:
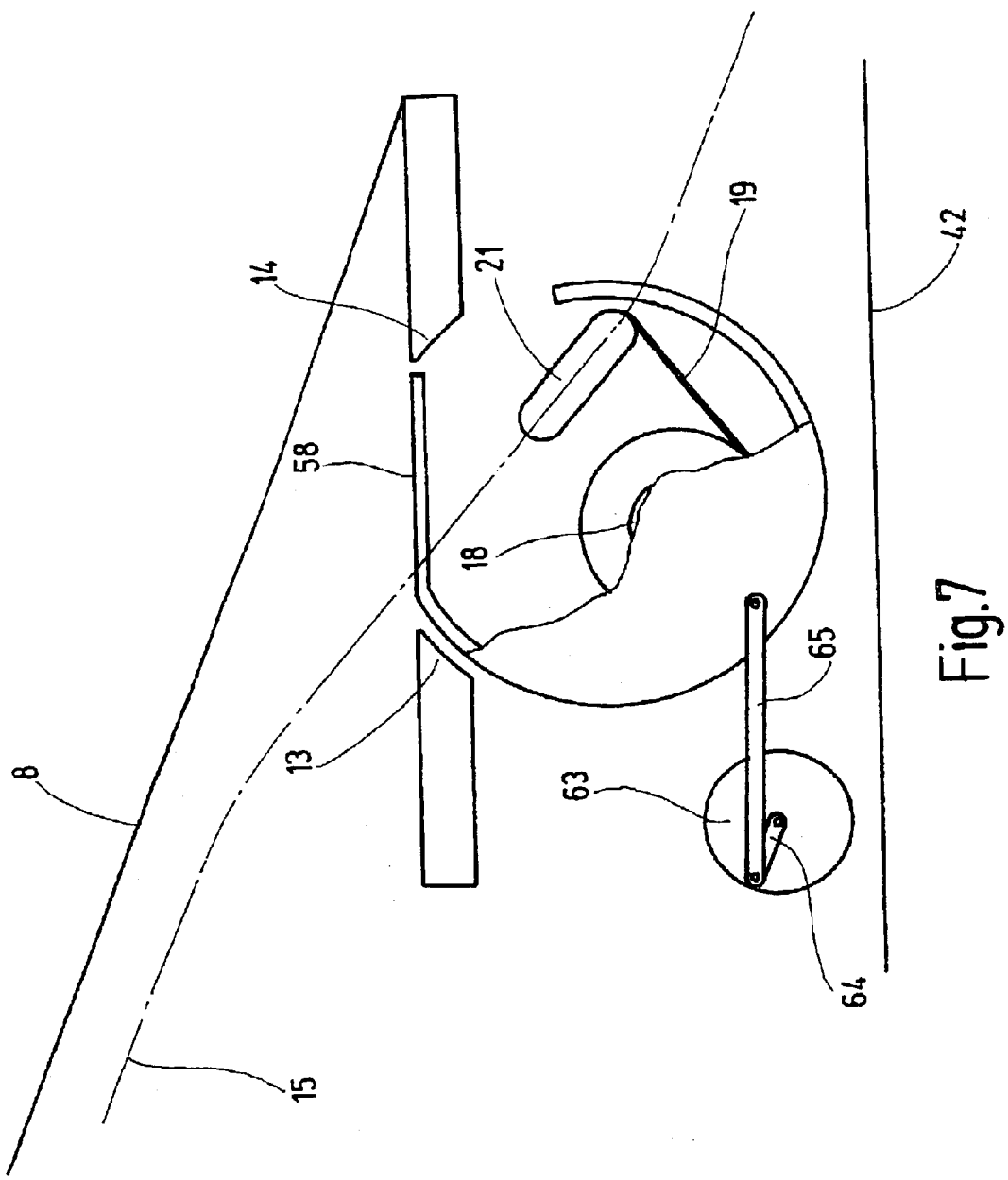
FIG. 7 is diagrammatic depiction of the rear window shade shown in FIG. 6, in a retracted state.

At its ends, the tube is partially closed off by end walls 59 in which a bearing pin 61 is seated. The window shade support 17 is rotatably seated between the clips 62, which are fixed on the vehicle body, by means of the bearing pin 61. A separate drive motor 63 in this instance is provided for performing the required pivot movement. The output shaft of the drive motor 63 has a crank 64 which is connected with a fastening pin 66 on the end wall 59 by means of a connecting rod 65. As before, the winding shaft 18 on which the window shade web 19 is wound is rotatably seated between the two end walls 59, as depicted in FIG. 7. Otherwise the structure corresponds to the structure of the exemplary embodiment in accordance with FIGS. 1 to 5.

In the position of rest, with the aid of the drive motor 63 the window shade support 17 is rotated into a position in which, as can be seen in FIG. 7, it essentially completely closes the slit 12 with its flattened side 58. The pull rod 21 is located underneath the rear window shelf 11, resting against the inside of the tube-shaped window shade support 17. The outlet slit 32 lies under the rear window shelf 11. The end wall 59 is designed such that the guide members 48 can laterally protrude past the window shade support 17 so that they are guided in the guide rail 15 which runs laterally past the end faces of the window shade support 17.

If the user wants to extend the rear window shade 16, the control switch for the motor 63 is activates the drive motor 54. By means of this, the pull rod 21 is pushed from the position shown in FIG. 7 forward in the direction toward the roof 2, i.e. in the direction toward the position represented in FIG. 6. The motor 63 is switched on synchronously with this movement and the window shade support 17 is rotated around its longitudinal axis.

Since the winding shaft 18 is not arranged coaxially in respect to the bearing pin 61, but instead laterally next to it, the rotating movement of the window shade support 17 also results in the winding shaft 18 with the belt of window shade material 19 wound on it being brought closer to the slit 12 in the rear window shelf 11. The pull rod 21 can leave the support 17 through the slit 57. It will be understood that the rear window-shade 16 is analogously retracted in the opposite direction.

Figure 8:
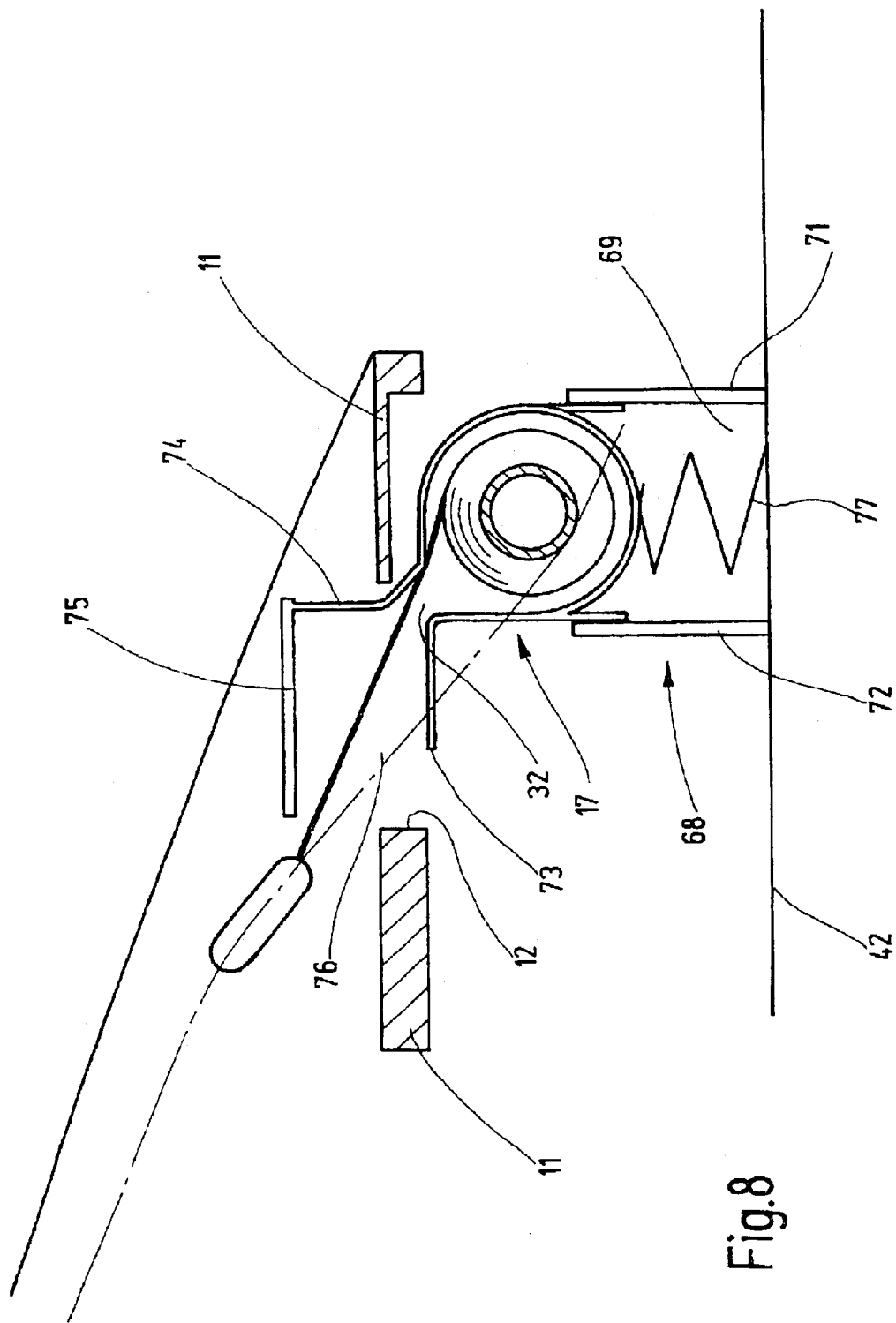
FIG. 8 is a depiction of an alternative embodiment of window shade having a vertically displaceable window shade frame, shown in a partially extended position.

FIG. 8 shows an embodiment in which the window shade support 17 is seated in a longitudinally displaceable manner in a support device 68. A guide pocket 69 is located on the base 42 fixed to the vehicle body and is bordered by two lateral walls 71 and 72. The window shade support 17 can be vertically displaced in this pocket. The window shade support 17 again is essentially embodied as a tube, which opens at one side as the outlet slit 32. A horizontally extending flange 73 adjoins the outlet slit. The upper slit edge makes a transition into a vertically upward extending leg 74, which supports a horizontally extending flange 75. A further slit 76 is delimited between the upper flange 75 and the lower flange 73. The dimensions of the upper flange 75 have been selected in such a way that it can substantially fill the slit 12 in the rear window shelf. The window shade support 17 is pre-tensioned by means of a spring 77 in its upper end position.

FIG. 8 represents the partially extended position, in which the pull rod 21 has passed the gap between the top of the rear window shelf 11 and the underside of the flange 75. The web 19 can easily be further extended in the previously mentioned way and in the course of this it is guided between the guide rails 15.

For retracting the window shade web 19, the drive motor 54 is caused to rotate in the opposite direction. Because of this, the push members 46 move back and the spring motor housed in the winding shaft can wind the window shade web 19 onto the winding shaft 18.

As indicated previously, the guide rails 15 extend in a way such that the surface formed between them intersects the lower leg 73. Therefore the pull rod 21 will enter the slit 76 through the gap between the top of the rear window shelf 11 and the flange 75 in the course of the retracting movement. The pull rod 21 will come into contact with the top of the leg 73 during the further retracting movement. The continued force-actuated downward movement of the pull rod 12 by means of the push members 46 carries the leg 73 downward so that the window shade frame 17 is moved downward into the pocket 69 against the force of the spring 77. The movement comes to an end as soon as the flange 75 closes the slit 12 in the rear window shelf 11, after which the position in accordance with FIG. 1 has again has been reached.

Figure 9:
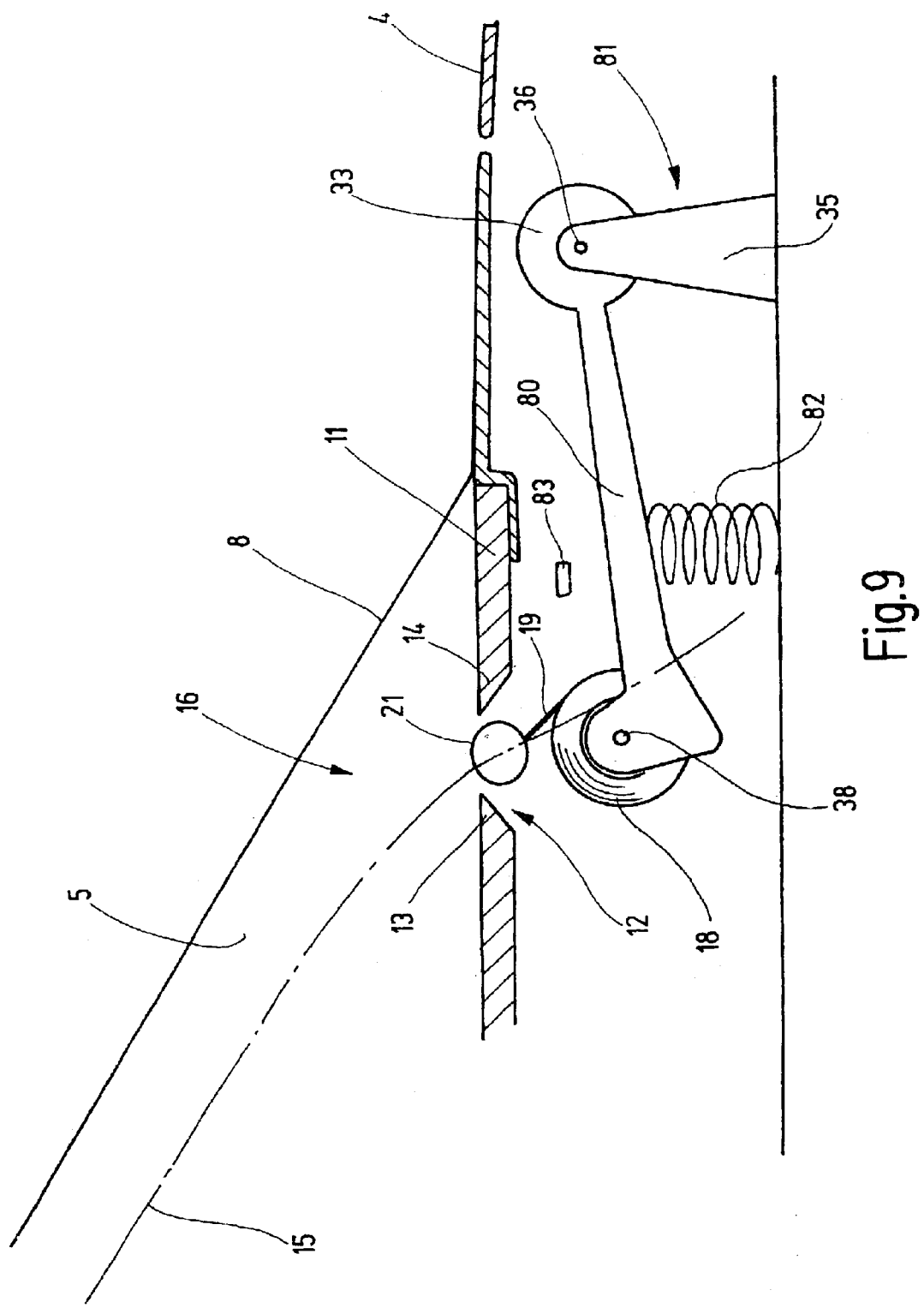
FIG. 9 is a depiction of an alternative embodiment in which the window shade slit is at least partially closed by the pull rod when in a retracted position.

In the alternative embodiment shown in FIG. 9, the window shade frame consists of two levers 80 separated from each other, which are spaced apart from each other to correspond to the length of the winding shaft 18. Each one of the two levers is seated at one end in its own bearing device 81, which is fixed on the vehicle body, so that it is pivotable around an axis which extends parallel in respect to the winding shaft 18. Moreover, each lever 80 is pre-tensioned in an upward direction toward the rear window shelf 11 by its own helical pressure spring 82. The winding shaft 18 is rotatably seated between the other ends of the levers 80. To this extent, the arrangement is similar to the arrangement as represented in FIGS. 3 and 4. The pull rod 21 in this case has an essentially circular cross section, whose diameter is such that it substantially fills the slit 12 in the rear window shelf 11.

The represented arrangement functions as follows:

In the retracted state, the drive motor 54 is stopped as soon as the pull rod 21 is located in the slit 12. In this state, the pull rod 21 per se rests on the outside of the belt formed by the window shade web 19 on the winding shaft 18. In this regard, FIG. 9 does not represent the actual retracted state, since the pull rod 21 is represented there as being spaced apart from the belt. It is intended by this to show a portion of the window shade web 19 which otherwise would not be visible. But in the retracted state, the belt actually rests against the underside of the pull rod 12 because of the force of the two springs 82 which push the two levers 80 at the two ends of the winding shaft upward, until this upward movement is stopped by the contact of the belt with the push rod 21.

For extending, the motor 54 is put into operation, as previously mentioned, so that the pull rod 21, guided in the guide rails 15, moves upward out of the slit 12 in the direction toward the roof. Since because of this, the pressure on the belt on the winding shaft 18 ends, the winding shaft 18 is moved relatively close to the outlet slit 12 by means of the two springs 82.

The lifting movement of the winding shaft 18 is terminated as soon as the two levers 80 individually come into contact with an associated stop 83 fixed in place on the vehicle body. The position of the stop 83 is suitably selected in such a way that the belt does not scrape against the edges 13 or 14 of the slit 12. Nevertheless, in this position the belt has been moved very closely toward the slit 12 so that the line along which the window shade web 19 is removed from the belt can be seen in the slit 12 for all practical purposes. The pivot movement performed by the window shade web 19 around this release line is too small, in spite of a narrow gap, for the window shade web 19 to come into contact with the edges 13 or 14 when the pull rod 21 moves along the guide rails 15 toward the roof 2.

The vertical movement of the winding shaft 18 allows the use of a very narrow slit 12 in comparison with an arrangement in which the winding shaft 18 is rigidly arranged, corresponding to the vertical extension of the pull rod 21, underneath the rear window shelf 11.

For closing the outlet slit, required by the rear window shade in a rear window shelf, to a large extent, the winding shaft of the rear window shade is seated in a window shade support which is movable in relation to the underside of the rear window shelf. Because of this, it is possible either to use the window shade support itself for closing the slit when the window shade web is in the retracted position, or the winding shaft can be moved close to the slit so that a narrow slit, which can be closed by a pull rod, becomes possible.

What is claimed is:

1. A rear window shade (16) for a rear window of motor vehicles comprising:

a window shade frame (17, 80), a winding shaft (18) rotatably supported in said frame (17, 80), a window shade web (19) having one edge fastened to the winding shaft (18) and an edge remote from the winding shaft (18), an actuating device (15, 46, 54) which acts together with the remote edge of the window shade web (19) for moving the window shade web (19) into an extended position in which it is located at least partially in front of the rear window, and a seating device (34, 62, 68, 81) for movably supporting the window shade frame (17, 80) in the motor vehicle such that the window shade frame (17) and the window shaft rotatably supported therein can be moved from a position of rest into an operating position.

2. The window shade of claim 1 in which the window shade frame (17, 80) has a tube-shaped element (22) in which the winding shaft (18) is located.

3. The window shade of claim 2 in which the tube-shaped element (22) has a slit (32) along its length.

4. The window shade of claim 2 in which the tube-shaped element (22) is flattened to form a lateral face (24, 58).

5. The window shade of claim 2 including bearings contained within the tube-shaped element (22) for rotatably supporting ends of the winding shaft.

6. The window shade of claim 2 in which said tube-shaped element (22) is substantially cylindrical.

7. The window shade of claim 2 in which said tube-shaped section (22) has bearing members (59, 61) in its ends which act together with the seating device (34, 62, 68, 81).

8. The window shade of claim 1 in which said window shade frame (17) has two spaced apart levers (80) that support the winding shaft (18).

9. The window shade of claim 1 in which said window shade frame (17, 80) is disposed adjacent a slit (12) in a rear window shelf (11) and said window shade frame closes the slit (12) when in said rest position.

10. The window shade of claim 9 in which said window shaft frame is formed with a flat portion, and said flat portion closes said slit when said window shade frame is in said rest position.

11. The window shade of claim 1 including a drive mechanism for driving the winding shaft in a direction for winding up the window shade web (19) onto the winding shaft (18).

12. The window shade of claim 11 in which said drive mechanism is a spring motor.

13. The window shade of claim 1 including a pull rod (21) connected with the remote edge of the window shade web (19), and at least one guide rail (15) for guiding movement of the pull rod (21) and the window shade (19) connected thereto.

14. The window shade of claim 12 in which said guide rail (15) extends adjacent to and a distance below the winding shaft (18).

15. The window shade of claim 13 in which said actuating device (46,54) moves the remote edge of said window shaped web (19) in a curved path tangentially past the winding shaft (18).

16. The window shade of claim 15 including a pair of said guide rails (15) between which opposite ends of said pull rod (21) are guided.

17. The window shade of claim 1 in which said actuating device (46, 54) is operable for moving the window shade frame (17, 80) from a position of rest into the operating position as an incident to moving the window shade web (19) into an extended position.

18. The window shade of claim 1 in which said actuating device (46, 54) is operable for moving said window shade frame (17, 80)from said operating position to said position of rest.

19. The window shade of claim 1 in which said actuating device is (46, 54) operable for moving said window shade frame (17, 80) from said rest position to said operating position.

20. The window shade of claim 1 in which said actuating device (46, 54) includes at least one pressure spring (41, 77).

21. The window shade of claim 1 in which said window shade frame (17, 80) is supported by said seating device (34, 62, 68, 81) for movement about a rotatory axis.

22. The window shade of claim 2 in which said seating device (34, 62, 68, 81) supports said window shade frame (17, 80) for movement about an axis of a rotary shaft that extends through said tube-shaped element (22).

23. The window shade of claim 2 in which said seating device (34, 62, 68, 81) moves said window shade frame (17, 80) about an axis of a rotary shaft which extends next to said tube-shaped element (22).

24. The window shade of claim 1 in which said seating device (34, 62, 68, 81) supports said window shade frame (17, 80) for translatory movement.

25. The window shade of claim 1 in which said seating device (34, 62, 68, 81) includes a sliding guide.

26. The window shade of claim 23 which said window shade web (19), is extendible through a slit in a rear window shelf (11) of the motor vehicle, a pull rod (21) connected to the remote edge of said window shade web (19), and said pull rod (21) being sized to substantially close the window shade slit (12) when the window shade is in a retracted position.

* * * * *